United States Patent
Ol et al.

(10) Patent No.: US 12,269,581 B2
(45) Date of Patent: Apr. 8, 2025

(54) SYSTEMS AND METHODS FOR EFFICIENT CRUISE AND HOVER IN VTOL

(71) Applicants: California Institute of Technology, Pasadena, CA (US); Toofon, Inc., Pasadena, CA (US)

(72) Inventors: Michael V. Ol, Pasadena, CA (US); Morteza Gharib, Altadena, CA (US)

(73) Assignees: TOOFON, INC., Pasadena, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 273 days.

(21) Appl. No.: 17/655,296

(22) Filed: Mar. 17, 2022

(65) Prior Publication Data

US 2022/0297822 A1    Sep. 22, 2022

Related U.S. Application Data

(60) Provisional application No. 63/162,410, filed on Mar. 17, 2021.

(51) Int. Cl.
*B64C 13/20* (2006.01)
*B64C 11/46* (2006.01)
(Continued)

(52) U.S. Cl.
CPC .............. *B64C 13/20* (2013.01); *B64C 11/46* (2013.01); *B64C 29/0025* (2013.01);
(Continued)

(58) Field of Classification Search
CPC ..... B64C 13/20; B64C 11/46; B64C 29/0025; B64C 39/024; B64C 39/08;
(Continued)

(56) References Cited

U.S. PATENT DOCUMENTS

| | | | |
|---|---|---|---|
| 3,179,353 A | | 4/1965 | Peterson |
| 4,601,444 A | * | 7/1986 | Lindenbaum ............. B64B 1/24 |
| | | | 244/26 |

(Continued)

FOREIGN PATENT DOCUMENTS

| | | |
|---|---|---|
| CN | 109533306 A | 3/2019 |
| CN | 112078784 A | 12/2020 |

(Continued)

OTHER PUBLICATIONS

"EVTOLS transportation of the future?", Xplane.org, General Discussion, Jul. 28, 2017, Retrieved from the Internet https://forums.x-plane.org/index.php?/forums/topic/126735-evtols-transportation-of-the-future/&page=6.

(Continued)

*Primary Examiner* — Donald J Wallace
*Assistant Examiner* — Jalal C Coduroglu
(74) *Attorney, Agent, or Firm* — Pillsbury Winthrop Shaw Pittman LLP

(57) ABSTRACT

A system of a multi-rotor aircraft that capitalizes on the advantages of fixed wing elements combined with rotary wing structures. The fixed wing elements can help to generate lift once the aircraft is airborne and can thus reduce the need for larger lifting rotors which can allow for longer flight times and distances. Additionally, the systems disclosed herein take advantage of a partial in-wing configuration with a number of rotors to reduce the overall footprint of the vehicle while maintaining the flight efficiency that comes with combining features of fixed and rotary wing elements, and increasing operator safety by shrouding rotating parts. The unique configurations allow for a decoupling of the pitch, yaw and roll authority to reduce the complexity in control systems and improve the flight efficiency of the aircraft. Additional configurations implement the use of (Continued)

smaller thrust rotors that can be used to generate thrust as well as control yaw and thus counteract any remaining unbalanced torque.

20 Claims, 11 Drawing Sheets

(51) Int. Cl.
 B64C 29/00 (2006.01)
 B64C 39/08 (2006.01)
 B64U 10/20 (2023.01)
 B64U 30/10 (2023.01)
 B64U 30/24 (2023.01)
 B64U 30/295 (2023.01)
 B64U 50/13 (2023.01)
(52) U.S. Cl.
 CPC ............ B64C 39/08 (2013.01); B64U 30/295 (2023.01); *B64U 10/20* (2023.01); *B64U 30/10* (2023.01); *B64U 30/24* (2023.01); *B64U 50/13* (2023.01); *B64U 2201/10* (2023.01); *B64U 2201/20* (2023.01)
(58) Field of Classification Search
 CPC ........................ B64U 2201/10; B64U 2201/20; B64U 10/20; B64U 30/10; B64U 30/24; B64U 50/13; B64U 30/295
 See application file for complete search history.

(56) References Cited

U.S. PATENT DOCUMENTS

| | | | |
|---|---|---|---|
| 4,880,071 A | 11/1989 | Tracy | |
| 5,505,407 A | 4/1996 | Chiappetta | |
| 5,971,320 A | 10/1999 | Jermyn | |
| 6,375,120 B1 | 4/2002 | Wolnek | |
| 6,467,726 B1 | 10/2002 | Hosoda | |
| 7,267,300 B2 | 9/2007 | Heath | |
| 7,364,114 B2 | 4/2008 | Wobben | |
| 7,857,254 B2 | 12/2010 | Parks | |
| 7,946,526 B2 | 5/2011 | Zimet | |
| 8,052,081 B2 | 11/2011 | Olm | |
| 8,376,266 B2 | 2/2013 | Gemmati | |
| 8,540,184 B2 | 9/2013 | Gemmati | |
| 9,051,050 B2 | 6/2015 | Achtelik | |
| 9,623,969 B2 | 4/2017 | Nelson | |
| 9,823,664 B2 | 11/2017 | Krogh | |
| 9,975,624 B1 | 5/2018 | Harvey | |
| 10,124,888 B2 | 11/2018 | Pounds | |
| 10,136,234 B2 | 11/2018 | Di Censo | |
| 10,315,759 B2 | 6/2019 | Nemovi | |
| D870,638 S | 12/2019 | Kuanliang | |
| 10,518,873 B2 | 12/2019 | Netzer | |
| 10,526,082 B2 | 1/2020 | Su | |
| 10,836,467 B2 | 11/2020 | Klein | |
| 11,021,844 B2 | 6/2021 | Kim | |
| 11,072,423 B1 | 7/2021 | Robertson | |
| 11,305,873 B2 | 4/2022 | Zhang | |
| 2004/0118970 A1* | 6/2004 | Muylaert | B64C 27/50 244/17.11 |
| 2006/0192046 A1 | 8/2006 | Heath | |
| 2006/0226281 A1 | 10/2006 | Walton | |
| 2007/0164148 A1* | 7/2007 | Van De Rostyne | A63H 27/06 244/17.21 |
| 2010/0022157 A1* | 1/2010 | Van de Rostyne | A63H 27/12 446/37 |
| 2013/0020432 A1* | 1/2013 | Yogev | B64C 9/12 244/90 A |
| 2013/0092799 A1 | 4/2013 | Tian | |
| 2014/0061367 A1* | 3/2014 | Fink | B64C 27/26 244/6 |
| 2014/0169980 A1* | 6/2014 | Kyriakides | F03D 1/0675 416/241 R |
| 2014/0263822 A1 | 9/2014 | Malveaux | |
| 2014/0312177 A1 | 10/2014 | Gaonjur | |
| 2015/0160255 A1* | 6/2015 | Fujihara | G01P 3/487 324/207.25 |
| 2015/0329204 A1 | 11/2015 | Nelson | |
| 2016/0009387 A1 | 1/2016 | Kummer | |
| 2016/0101850 A1 | 4/2016 | Lin | |
| 2016/0207368 A1* | 7/2016 | Gaonjur | B60F 5/02 |
| 2016/0207625 A1 | 7/2016 | Judas | |
| 2016/0311526 A1* | 10/2016 | Geise | B64C 27/14 |
| 2016/0347446 A1* | 12/2016 | Vetter | B64U 30/24 |
| 2017/0158306 A1* | 6/2017 | Kooiman | B64C 29/0033 |
| 2017/0197709 A1* | 7/2017 | Fink | B64C 3/185 |
| 2017/0349272 A1 | 12/2017 | Laurent | |
| 2018/0057163 A1 | 3/2018 | Sababha | |
| 2018/0141652 A1 | 5/2018 | Deslypper | |
| 2018/0244377 A1 | 8/2018 | Chan | |
| 2018/0305008 A1* | 10/2018 | Apkarian | B64C 27/52 |
| 2019/0061933 A1 | 2/2019 | Cappelleri | |
| 2019/0101934 A1 | 4/2019 | Tuukkanen | |
| 2019/0106206 A1* | 4/2019 | Shi | B64U 30/295 |
| 2019/0135411 A1* | 5/2019 | Gonzalez | B64C 27/54 |
| 2019/0369057 A1 | 12/2019 | Mattar | |
| 2020/0017204 A1 | 1/2020 | Lacy | |
| 2020/0269980 A1 | 8/2020 | Fink | |
| 2021/0070431 A1 | 3/2021 | Nakamats | |
| 2021/0284333 A1 | 9/2021 | Windisch | |
| 2021/0371093 A1 | 12/2021 | Nakamats | |
| 2022/0089279 A1* | 3/2022 | Rosen | B64C 29/02 |
| 2022/0169376 A1* | 6/2022 | Dugré | B64C 27/82 |
| 2022/0169398 A1* | 6/2022 | Ouellet | B64C 27/82 |
| 2022/0185464 A1 | 6/2022 | Gharib | |
| 2022/0194573 A1 | 6/2022 | Nemovi | |
| 2022/0227489 A1 | 7/2022 | Ol | |
| 2022/0297822 A1 | 9/2022 | Ol | |

FOREIGN PATENT DOCUMENTS

| | | |
|---|---|---|
| CN | 112357070 A | 2/2021 |
| DE | 102005003028 A1 | 7/2006 |
| GB | 281721 A | 8/1928 |
| GB | 2418405 A | 3/2006 |
| GB | 2455374 A | 6/2009 |
| GB | 2483881 A | 3/2012 |
| JP | 2002347698 A | 12/2002 |
| JP | 2014119828 A | 6/2014 |
| JP | 2019181965 A | 10/2019 |
| JP | 2020033000 A | 3/2020 |
| JP | 2020131779 A | 8/2020 |
| KR | 20120060590 A | 6/2012 |
| KR | 101784372 B1 | 10/2017 |
| KR | 20170111921 A | 10/2017 |
| KR | 20180069594 A | 6/2018 |
| KR | 101884902 | 8/2018 |
| KR | 101894409 B1 | 9/2018 |
| KR | 102025687 B1 | 9/2019 |
| WO | 2016089882 A1 | 6/2016 |
| WO | 2016164280 A1 | 10/2016 |
| WO | 2017035593 A1 | 3/2017 |
| WO | 2017081668 A1 | 5/2017 |
| WO | 2020191489 A1 | 10/2020 |
| WO | 2022125132 A1 | 6/2022 |
| WO | 2022139864 A1 | 6/2022 |
| WO | 2022150833 A1 | 7/2022 |
| WO | 2022159951 A1 | 7/2022 |
| WO | 2022198225 | 9/2022 |

OTHER PUBLICATIONS

"Fully Mobile, Always Adaptable: Kinetic Mesh Wireless Mesh Networks", Rajant Corporation, Aug. 16, 2018, Retrieved from the Internet https://rajant.com/technology/rajant-kinetic-wireless-mesh-networks/ on Dec. 22, 2021.

"Must quadcopters have the same propeller sizes?", Aviation, Oct. 21, 2018, Retrieved from the Internet https://aviation.stackexchange.com/questions/56237/must-quadcopters-have-the-same-propeller-sizes.

(56) References Cited

OTHER PUBLICATIONS

"Why aren't there more manned quadcopter designs?", Mavic Pilots, Mar. 10, 2017, Retrieved from the Internet https://mavicpilots.com/threads/why-arent-there-more-manned-quad-copter-designs.10077/ p. 2.

Achtelik et al., Design of a multi rotor mav with regard to efficiency, dynamics and redundancy; AIAA Guidance, Navigation, and Control Conference, Aug. 13-16, AIA 2012-4779, pp. 1-17, doi: doi.org/10.2514/6.2012-4779.

Alwi et al., Fault tolerant control of an octorotor using lpv based sliding mode control allocation; American Control Conference, Jun. 17-19, 2013, pp. 6505-6510, doi: 10.1109/ACC.2013.6580859.

Bandyopadhyay et al., Nonlinear attitude control of spacecraft with a large captured object; Journal of Guidance, Control, and Dynamics, Apr. 4, 2016, vol. 39, No. 4, pp. 754-769, doi: 10.2514/1.G001341.

Bry et al., Aggressive flight of fixed-wing and quadrotor aircraft in dense indoor environments; The International Journal of Robotics Research, Mar. 20, 2015, vol. 34, No. 7, pp. 969-1002, doi: 10.1177/0278364914558129.

Choi et al., Optimization of Multi-Package Drone Deliveries Considering Battery Capacity; Presentation at the 2017 TRB 96 27th Annual Meeting, 2016, Optimization of Multi-Package Drone Deliveries Considering Battery Capacity, 16 pgs.

Chowdhury et al., Back-stepping control strategy for stabilization of a tilt-rotor uav; 24th Chinese Control and Decision Conference, May 23-25, 2012, pp. 3475-3480, doi: 10.1109/CCDC.2012.6244555.

Chung et al., Autonomous Flying Ambulance; Aerospace Robotics and Control at Caltech, Sep. 1, 2018, aerospacerobotics.caltech.edu/urban-air-mobility-and-autonomous-flying-cars/, 8 pgs.

Crowther et al., Kinematic analysis and control design for a nonplanar multirotor vehicle; Journal of Guidance, Control, and Dynamics, Jul.-Aug. 2011, vol. 34, No. 4, pp. 1157-1171, doi: 10.2514/1.51186.

Du et al., Controllability Analysis and Degraded Control for a Class of Hexacopters Subject to Rotor Failures; Journal of Intelligent & Robotic Systems, 2015, vol. 78, No. 1, pp. 143-157, doi: 10.1007/s10846-014-0103-0.

Du, "Pentacopter build log", DYI Drones, Jul. 20, 2018, Retrieved from the Internet https://diydrones.com/profiles/blogs/pentacopter-build-log.

Efraim et al., Quadrotor with a dihedral angle: on the effects of tilting the rotors inwards; Journal of Intelligent & Robotic Systems, Jan. 2, 2015, vol. 80, No. 2, pp. 313-324, doi: 10.1007/s10846-015-0176-4.

Enns, Control allocation approaches; "Guidance, Navigation, and Control Conference and Exhibit, 1998, pp. 98-108, doi: 10.2514/6.1998-4109.".

Extended European Search Report for European Application No. 18864524.6, Search completed May 14, 2021, Mailed May 21, 2021, 11 Pgs.

Falconi et al., Adaptive fault tolerant control allocation for a hexacopter system; American Control Conference, Jul. 6-8, 2016, pp. 6760-6766, doi: 10.1109/ACC.2016.7526736.

Floreano et al., Science, technology and the future of small autonomous drones; Nature, May 28, 2015, vol. 521, pp. 460-466, doi: 10.1038/nature14542.

Frank et al., Hover, transition, and level flight control design for a single-propeller indoor airplane; AIAA Guidance, Navigation and Control Conference and Exhibit, Aug. 20-23, 2007, doi: https://doi.org/10.2514/6.2007-6318.

GALCIT AFA; Sep. 18, 2018, 3 pgs.

Giribet et al., Analysis and design of a tilted rotor hexacopter for fault tolerance; IEEE Transactions on Aerospace and Electronic Systems, Aug. 2016, vol. 52, No. 4, pp. 1555-1567, doi: 10.1109/TAES.2016.140885.

Hauser et al., Aggressive flight maneuvers; Proceedings of the 36th IEEE Conference on Decision and Control, Dec. 12, 1997, vol. 5, pp. 4186-4191, doi: 10.1109/CDC.1997.649490.

Hermann et al., Nonlinear Controllability and Observability; IEEE Transactions on Automatic Control, Oct. 1977, vol. AC-22, No. 5, pp. 728-740, doi: 10.1109/TAC.1977.1101601.

Holden et al., Uber elevate: Fast-forwarding to a future of on-demand urban air transportation; Uber, Tech. Rep., Oct. 27, 2016, 98 pgs.

Hua et al., A control approach for thrust-propelled underactuated vehicles and its application to vtol drones; IEEE Transactions on Automatic Control, Jul. 24, 2009, vol. 54, No. 8, pp. 1837-1853, doi: 10.1109/TAC.2009.2024569.

International Preliminary Report on Patentability for International Application No. PCT/US2018/054017, Issued on Apr. 8, 2020, Mailed on Apr. 16, 2020, 12 pgs.

International Preliminary Report on Patentability for International Application No. PCT/US2022/07055, dated Aug. 3, 2023, 6 pages.

International Search Report and Written Opinion for International Application No. PCT/US2018/054017, Search completed Jan. 31, 2019, Mailed Jan. 31, 2019, 17 pgs.

International Search Report and Written Opinion for International Application No. PCT/US2021/028467, Search completed Sep. 9, 2021, Mailed Sep. 10, 2021, 8 Pgs.

International Search Report and Written Opinion for International Application No. PCT/US2021/028483, Search completed Sep. 17, 2021, Mailed Sep. 17, 2021, 8 Pgs.

International Search Report and Written Opinion for International Application No. PCT/US2022/070079, Search completed May 3, 2022, Mailed May 3, 2022, 7 Pgs.

International Search Report and Written Opinion for International Application No. PCT/US2022/070255, Search completed May 10, 2022, dated May 10, 2022, 8 Pgs.

International Search Report and Written Opinion for International Application No. PCT/US2022/071201, Search completed Jun. 27, 2022, Mailed Jun. 30, 2022, 12 Pgs.

Johansen et al., Control allocation a survey; Automatica, May 2013, vol. 49, No. 5, pp. 1087-1103, doi: 10.1016/j.automatica.2013.01.035.

Kalman et al., Contributions to the Theory of Optimal Control; Bol. Soc. Mat. Mexicana, 1960, vol. 5, No. 2, pp. 102-119.

Kaufman et al., Design and Development of a Free-Floating Hexrotor UAV for 6-DOF Maneuvers; IEEE Aerospace Conference, Mar. 1-8, 2014, pp. 1-10, doi: 10.1109/AERO.2014.6836427.

Klumpp; Singularity-free extraction of a quaternion from a direction-cosine matrix; Journal of spacecraft and rockets, Feb. 17, 1976, vol. 13, No. 12, pp. 754-755, doi: 10.2514/3.27947.

Lanzon et al., Flight control of a quadrotor vehicle subsequent to a rotor failure; Journal of Guidance, Control, and Dynamics, Feb. 12, 2014, vol. 37, No. 2, pp. 580-591, doi: 10.2514/1.59869.

Lee et al., Fault Tolerant Control of Hexacopter for Actuator Faults using Time Delay Control Method; International Journal of Aeronautical and Space Sciences, Jan. 14, 2016, vol. 17, No. 1, pp. 54-63, doi: 10.5139/IJASS.2016.17.1.54.

Lee, Exponential stability of an attitude tracking control system on so (3) for large-angle rotational maneuvers; Systems & Control Letters, Jan. 2012, vol. 61, No. 1, pp. 231-237, doi: 10.1016/j.sysconle.2011.10.017.

Lenski, "Design, Construction and Operation of a Pentacopter", Thesis, Lulea University of Technology, Department of Computer Science, Electrical and Space Engineering, Mar. 2017, 84 pgs.

Lillian, "A Bunnycopter and Pentacopter? MIT Lets You Create Whatever Drone You Want", Unmanned Aerial, Dec. 5, 2016, Retrieved from the Internet https://unmanned-aerial.com/a-bunnycopter-and-pentacopter-mit-lets-you-create-whatever-drone-you-want.

Markforged, Markforged Materials, Sep. 28, 2018, markforged.com/materials/#onyx, 7 pgs.

Meier et al., Pixhawk: A micro aerial vehicle design for autonomous flight using onboard computer vision; Autonomous Robots, Aug. 2012, vol. 33, No. 1-2, pp. 21-39, doi: 10.1007/s10514-012-9281-4.

Mellinger et al., Minimum snap trajectory generation and control for quadrotors; IEEE International Conference on Robotics and Automation, May 9-13, 2011, pp. 2520-2525, doi: 10.1109/ICRA.2011.5980409.

(56) References Cited

OTHER PUBLICATIONS

Menon et al., Nonlinear flight test trajectory controllers for aircraft; Journal of Guidance, Control, and Dynamics, Jan.-Feb. 1987, vol. 10, No. 1, pp. 67-72, doi: doi.org/10.2514/3.20182.

Michieletto et al., Control of statically hoverable multi-rotor aerial vehicles and application to rotor-failure robustness for hexarotors; IEEE International Conference on Robotics and Automation, May 29-Jun. 3, 2017, pp. 2747-2752, doi: 10.1109/ICRA.2017.7989320.

Mohamed et al., "Design and Control of Novel Tri-rotor UAV", IEE Proceedings of 2012 UKACC International Conference on Control, Sep. 3-5, 2012, DOI: 10.1109/CONTROL.2012.6334647.

Mueller et al., Stability and control of a quadrocopter despite the complete loss of one, two, or three propellers; Robotics and Automation, IEEE International Conference, May 31-Jun. 7, 2014, pp. 45-52, doi: 10.1109/ICRA.2014.6906588.

Murray et al., The flying sidekick traveling salesman problem: Optimization of drone-assisted parcel delivery; Transportation Research Part C: Emerging Technologies, Mar. 2015, vol. 54, pp. 86-109, doi: 10.1016/j.trc.2015.03.005.

Oosedo et al., Optimal transition from hovering to level-flight of a quadrotor tail-sitter uav; Autonomous Robots, 2017, First Published Jul. 25, 2016, vol. 41, No. 5, pp. 1143-1159, doi: 10.1007/s10514-016-9599-4.

Papachristos et al., Model predictive attitude control of an unmanned tilt-rotor aircraft; Industrial Electronics, IEEE International Symposium on Jun. 27-30, 2011, pp. 922-927, doi: 10.1109/ISIE.2011.5984282.

Park et al., Fault tolerant flight control system for the tilt-rotor uav; Journal of the Franklin Institute, Nov. 2013, vol. 350, No. 9, pp. 2535-2559, doi: 10.1016/j.jfranklin.2013.01.014.

Perez et al., A ground control station for a multi-uav surveillance system; Journal of Intelligent & Robotic Systems, vol. 69, No. 1, Jan. 2013, pp. 119-130, doi: 10.1007/s10846-012-9759-5.

Renuke, Dynamic Analysis of a Car Chassis; International Journal of Engineering Research and Applications, vol. 2, No. 6, Nov.-Dec. 2012, pp. 955-959.

Ritz et al., A global controller for flying wing tailsitter vehicles; IEEE International Conference on Robotics and Automation, May 29-Jun. 3, 2017, pp. 2731-2738, doi: 10.1109/ICRA.2017.7989318.

Rogers, Propeller Efficiency Rule of Thumb; NAR Associates, 2010, 5 pgs.

Ryll et al., A novel overactuated quadrotor unmanned aerial vehicle: Modeling, control, and experimental validation; IEEE Transactions on Control Systems Technology, Nov.-Dec. 2012, Jul. 30, 2014, vol. 23, No. 2, pp. 540-556, doi: 10.1109/TCST.2014.2330999.

Ryll et al., Modeling and control of fast-hex: A fully-actuated by synchronizedtilting hexarotor; IEEE/RSJ International Conference on Intelligent Robots and Systems, Oct. 9-14, 2016, pp. 1689-1694, doi: 10.1109/IROS.2016.7759271.

Rysdyk et al., Adaptive model inversion flight control for tilt-rotor aircraft; Journal of guidance, control, and dynamics, May-Jun. 1999, vol. 22, No. 3, pp. 402-407, doi: 10.2514/2.4411.

Saied et al., Fault diagnosis and fault-tolerant control strategy for rotor failure in an octorotor; IEEE International Conference on Robotics and Automation, May 26-30, 2015, pp. 5266-5271, doi: 10.1109/ICRA.2015.7139933.

Sheldahl et al., Aerodynamic characteristics of seven symmetrical airfoil sections through 180-degree angle of attack for use in aerodynamic analysis of vertical axis wind turbines; Sandia National Labs., Albuquerque, NM (USA), Technical Report, 1981, doi: 10.2172/6548367.

Shepperd, Quaternion from rotation matrix.[four-parameter representation of coordinate transformation matrix],; Journal of Guidance and Control, Jun. 1, 1978, vol. 1, pp. 223-224.

Stone et al., Flight testing of the t-wing tail-sitter unmanned air vehicle; Journal of Aircraft, Mar.-Apr. 2008, vol. 45, No. 2, pp. 673-685, doi: 10.2514/1.32750.

Tayebi et al., Attitude stabilization of a vtol quadrotor aircraft; IEEE Transactions on control systems technology, Apr. 24, 2016, vol. 14, No. 3, pp. 562-571, doi: 10.1109/TCST.2006.872519.

Tomic et al., Toward a fully autonomous uav: Research platform for indoor and outdoor urban search and rescue; IEEE Robotics Automation Magazine, Sep. 4, 2012, vol. 19, No. 3, No. 46-56, doi: 10.1109/MRA.2012.2206473.

Veismann et al., Autonomous Flying Ambulance Aerodynamic Characterization; Analysis Report, California Institute of Technology, Aug. 9, 2018, 20 pgs.

Wick, Study of the subsonic forces and moments on an inclined plate of infinite span; National Advisory Committee for Aeronautics, Technical Note 3221, Jun. 1954, 26 pgs.

Yumurtaci, "Help with Differential Thrust for a VTOL", ArduPilot, May 2020, Retrieved from the Internet https://discuss.ardupilot.org/t7help-with-differential-thrust-for-a-vtol/56029.

Zhang et al., A controllable flying vehicle with a single moving part; IEEE International Conference on Robotics and Automation, May 16-21, 2016, pp. 3275-3281, doi: 10.1109/ICRA.2016.7487499.

* cited by examiner

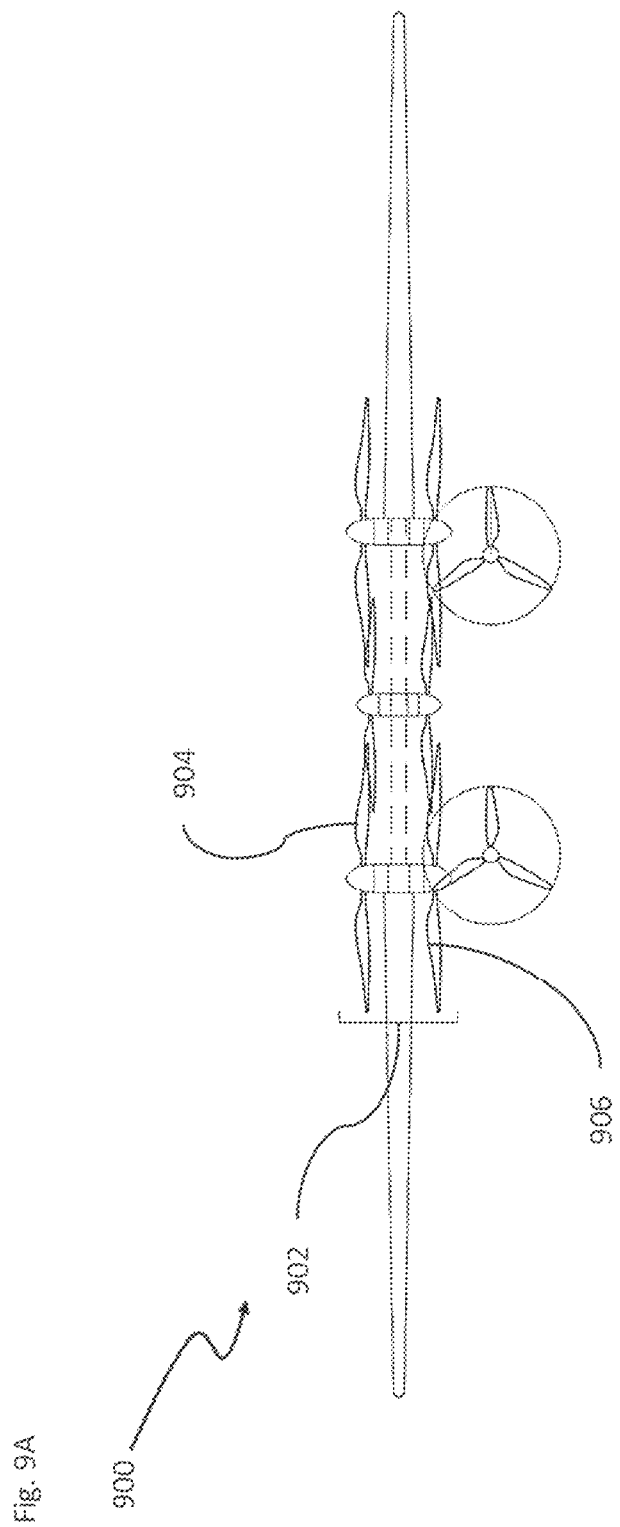

SYSTEMS AND METHODS FOR EFFICIENT CRUISE AND HOVER IN VTOL

CROSS-REFERENCED APPLICATIONS

This application claims priority to U.S. Provisional application 63/162,410 filed on Mar. 17, 2021. The disclosures of which are included herein by reference in their entirety.

FIELD OF THE INVENTION

The present invention generally relates to multi-rotor aircraft. More specifically, it relates to the application of partial winged elements to improve the hover and cruise capabilities of the aircraft.

BACKGROUND

Most Vertical Takeoff and Landing (VTOL) vehicles are multi-copter vehicles having a number of different rotors. Typical VTOL systems have multiple fixed-pitch rotors that work to produce the forces necessary for flight; which include lift, thrust, and side force, as well as roll, pitch, and yaw. Traditionally, for a VTOL multi-rotor copter the rotors are similar to an airplane propeller and are configured in the horizontal plane. This configuration generally provides the lift force necessary to lift the aircraft into the air for flight. The configuration of rotors or propellers can also be used to provide thrust forces at speeds that are generally below those needed for a fixed winged aircraft, where the wing can provide lift when moving at higher speeds. The forward thrust in a VTOL aircraft is typically managed by the control or change in rotational speed (RPM) of the various rotors. This can be done by varying the speed of one or more rotors to drive the direction of the vehicle by changing the thrust or torque generated by the rotors.

The vast majority of drones and VTOL aircraft tend to be a quad copter design with four rotors. This is largely due to developments in flight control systems to stabilize a quad copter Changes to the speeds of individual rotors, pairs of rotors or other combination of rotors can allow for relatively precise vehicle control. For example, reducing speed on all four rotors can allow for a smooth decent. Likewise, changes in speed of the aft two rotors can cause forward flight and the opposite is true for change in the forward two rotors. Similarly, the moment controls of roll, pitch, and yaw can be adjusted through changing speeds in the various rotors. Accordingly, flight control systems can be largely simplified making the quad copter an easy, go to design for VTOL. However, many such traditional designs can create issues in scalability, especially when trying to manage the various movements and moments of the aircraft. This is because changing the speed of large rotors is cumbersome. Furthermore, traditional VTOL designs have limited range because they are not suited for longer sustained flight paths.

SUMMARY OF THE INVENTION

Many embodiments are directed to a multi-rotor vehicle that has an plurality of rotors disposed about a body of an aircraft. Also common are six rotors or eight rotors, the latter arranged all in one plane or in two parallel plates, as a coaxial configuration, with rotors pairs, one above the other. The rotors can be various sized and in any number of configurations. Many embodiments of the aircraft can be configured with a partial wing structure.

Many embodiments are directed to a multi-rotor vehicle with a body structure and at least two main rotors connected to the body structure where the at least two main rotors are symmetrically disposed about a symmetry plane of the vehicle having at least one propeller and each of the at least two main rotors are configured to generate lift for the vehicle. The vehicle also has at least one auxiliary rotor connected to the body structure disposed centrally along the symmetry plane being separated from the plurality of main rotors by a distance greater than a diameter of the at least two main rotors such that a downwash from the at least two main rotors and a downwash from the at least one auxiliary rotor does not interfere. There may also be at least two horizontal thrust rotors connected to the body structure and evenly disposed about the symmetry plane and configured to generate thrust in a forward direction such that a rotational plane of the thrust rotors is perpendicular to a rotational plane of the at least two main rotors. The vehicle also can be configured with at least one fixed wing element symmetrically and removably disposed on the body structure and configured to provide additional lift for the vehicle, and wherein at least one of the auxiliary rotors or at least two main rotors are partially enclosed by the at least one fixed wing element.

In other embodiments, the at least two horizontal thrust rotors can be used to affect a yaw moment in the vehicle through adjusting a rotational speed of each of the at least two horizontal thrust rotors.

In still other embodiments, the body structure is a plurality of elongated structural support elements and disposed such that at least one structural support element interconnects at least two main rotors and additional structural support elements interconnect the main rotors to the first set auxiliary rotors.

In yet other embodiments, the at least one auxiliary rotor is smaller than each of the at least two main rotors.

In still yet other embodiments, the vehicle has a plurality of control surfaces disposed in an aft portion of the wing element, wherein each of the plurality of control surfaces can be adjusted to control the movement of air around the fixed wing element thus enabling flight control or control of the pitch, roll, and yaw of the vehicle.

In other embodiments, the vehicle has a second auxiliary rotor wherein the at least one auxiliary rotor is disposed forward of the at least two main rotors and the second auxiliary rotor is disposed aft of the at least two main rotors.

In still other embodiments, each of the at least one and second auxiliary rotors are smaller than the at least two main rotors.

In yet other embodiments, the vehicle has at least one empennage disposed on at least an aft portion of the fixed wing element.

In still yet other embodiments, the empennage further comprises at least on control surface.

In other embodiments, the vehicle has at least two empennages.

In still other embodiments, each of the at least two main rotors has at least two propellers coaxially aligned wherein at least one of the at least two propellers is located directly above the other propeller.

In yet other embodiments, the vehicle has a horizontal stabilizer wing disposed on the body structure and located aft of the at least two main rotors.

In still yet other embodiments, the vehicle has at least one control surface disposed within the horizontal stabilizer wing.

In other embodiments, the vehicle has a control system disposed within the body of the vehicle and wherein the control system is connected to each of the at least two main rotors, the at least one auxiliary rotor and the at least two forward thrusters such that the control system can transmit control signals to each of the rotors and thereby control the lift, pitch, yaw, and roll of the vehicle.

In still other embodiments, the control system is managed remotely by a computer.

In yet other embodiments, the control system is managed remotely by a human.

In still yet other embodiments, the fixed wing element fully encloses the at least two main rotors and the at least one auxiliary rotor.

In other embodiments, the vehicle has at least a second fixed wing element disposed on the body structure wherein the at least second fixed wing element is disposed aft of the at least two main rotors and aft of the at least one fixed wing element.

In still other embodiments, the at least one fixed wing element has a front leading edge with a swept back design. Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein:

FIG. 9A illustrates a profile view of a multi-rotor vehicle with coaxial rotors in accordance with embodiments.

DETAILED DESCRIPTION

Turning now to the drawings, systems and methods for improving flight control are illustrated. Many embodiments are directed to an aircraft with multiple rotor systems that are placed on a body structure such that they can provide vertical thrust. Additionally, many embodiments have fixed wing elements that are positioned around or in close proximity to the multiple rotor systems. Such embodiments, allow for the vehicle to capitalize on the efficiency for long range flight provided by fixed wing elements combined with rotor flight capabilities in vehicles with smaller foot prints, achieved by placing the wing(s) such, as to minimize interference with rotor performance by the wing(s), or wing performance by the rotors. In various embodiments, the vehicle has two main lifting rotors configured to provide sufficient vertical lift for the vehicle. The vehicle also has at least one additional auxiliary rotors that can augment the lift generated by the main rotors that can be used to alter or control the pitch and roll of the vehicle during flight. The wing elements, in accordance with various embodiments can be configured to be shrouds that partially or fully surround one or more of the rotors. Some embodiments may also incorporate additional surfaces such as control surfaces that can be integrated into the wing elements to allow for improved controllability of the vehicle during flight.

Figure 1:
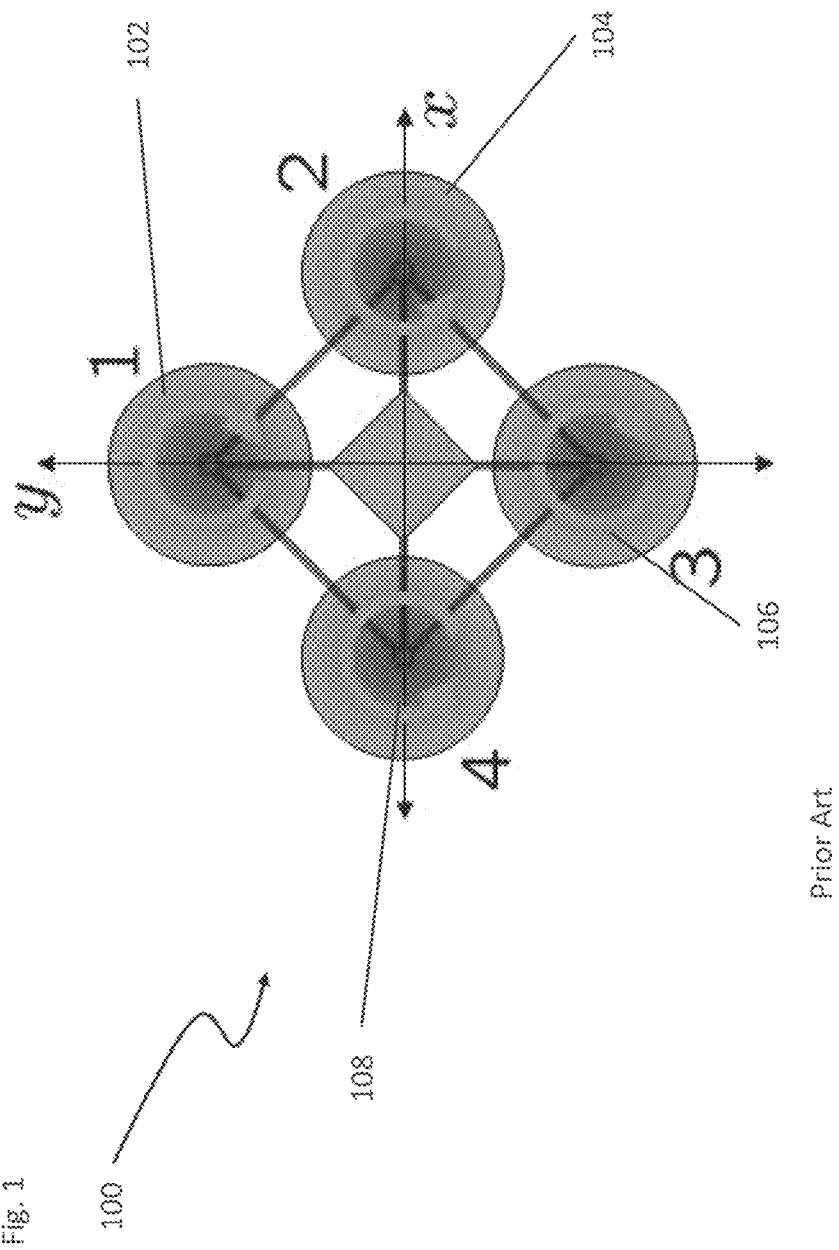
FIG. 1 illustrates a traditional quad copter configuration consistent with known art.

Conventional VTOL and copter type drones tend to use a fixed-pitch approach to rotors. As previously mentioned, the conventional flight control is managed through the acceleration/deceleration of one or more of the rotors. For example, FIG. 1 illustrates a conventional layout of a quadcopter 100 with individual rotors 102-108. As can be seen, each of the adjacent rotors are configured to rotate in opposing directions to help balance the torque generated by each rotor. The desired change in moments (roll, pitch, yaw) entails a change in forces (lift, thrust, side force) which can require non-linear relationships that require control software to implicitly decouple the moments from the forces to allow for accurate control of the vehicle. An example is change in vehicle pitch can produce large change in lift, which has to be compensate in software. Additionally, more conventional designs inherently account for the torque generated by the rotors by providing an equal and opposite rotor to counter the torque generated. This limits the plurality of rotors that can be fitted, for example excluding an odd number of rotors.

Maximization of overall aircraft efficiency covering the disparate missions of vertical flight, and cruising flight, is a longstanding conundrum. Efficiency in Vertical Takeoff and Landing (VTOL) and in hover operations varies with rotor disk loading, since there is insufficient aircraft forward-speed to generate a dynamic pressure useful for lift. What matters is the size of the rotors, their design and their integration into the airframe. Classical momentum-considerations show that the smaller the disk loading, or ratio of aircraft total weight to cumulative swept area of the lifting-rotors (whose thrust is in the vertical direction), the longer the hover-endurance, for a given amount of onboard energy. Thus, conventional helicopters are more efficient in hover, than are tilt-rotors, which in turn are more efficient in hover than turbojet vehicles with vertical nozzles.

Low disk loading has been successfully used for efficient VTOL machines. Low disk loading means large diameter rotors, or large plurality of smaller rotors. This, however, impedes the competing goal of good cruise efficiency, for which it is necessary to increase the lift to drag ratio. Drag is the total vehicle drag, from rotors in edgewise flight, from the parasite drag of the aircraft, and from induced drag of lifting surfaces such as wings. The latter is reduced by increasing wing aspect ratio, or ultimately span. Longer wing spans can be hard to integrate aerodynamically and structurally in a configuration with large fans. Streamlining the overall configuration generally means high fineness ratio, or large ratio of span (or fuselage length) to depth/height. This again means large span or large planform area. Additionally, if the wings or some portions of wings are vertically underneath the fans, or in close proximity to the fans, this results in the so-called download problem, where the moment of the airflow through the fan— which is what ultimately produces vertical thrust— is impeded by the obstruction by the wings. This is a penalty in installed-thrust and hence in VTOL performance. To reduce it, there are several alternatives. One is to place the wings away from the fans. Another is the opposite: place the fans inside the wing planform, resulting in the so-called "fan in wing."

Additionally, some conventional systems also utilize alternative anti-torque mechanisms such as a tail or a complex software that blends commands to other rotors. This results in a complex highly coupled flight control system. By coupled, we are referring to the coupling between rotors and the control of the rotors to effect all three axes of translational force and all three axes of rotational moment. Furthermore, due to the complexity and coupling of the control of the plurality of rotors, the control bandwidth is limited by the rate of acceleration/deceleration of the subject rotors. As the vehicle size increases, the control bandwidth become untenably small. Accordingly, scalability can be limited with more traditional fixed pitch rotor designs creating more complexity in control and design configuration. The alternative is the articulated, cyclic-pitch capabilities of the helicopter or the tilt-rotor.

Figure 2:
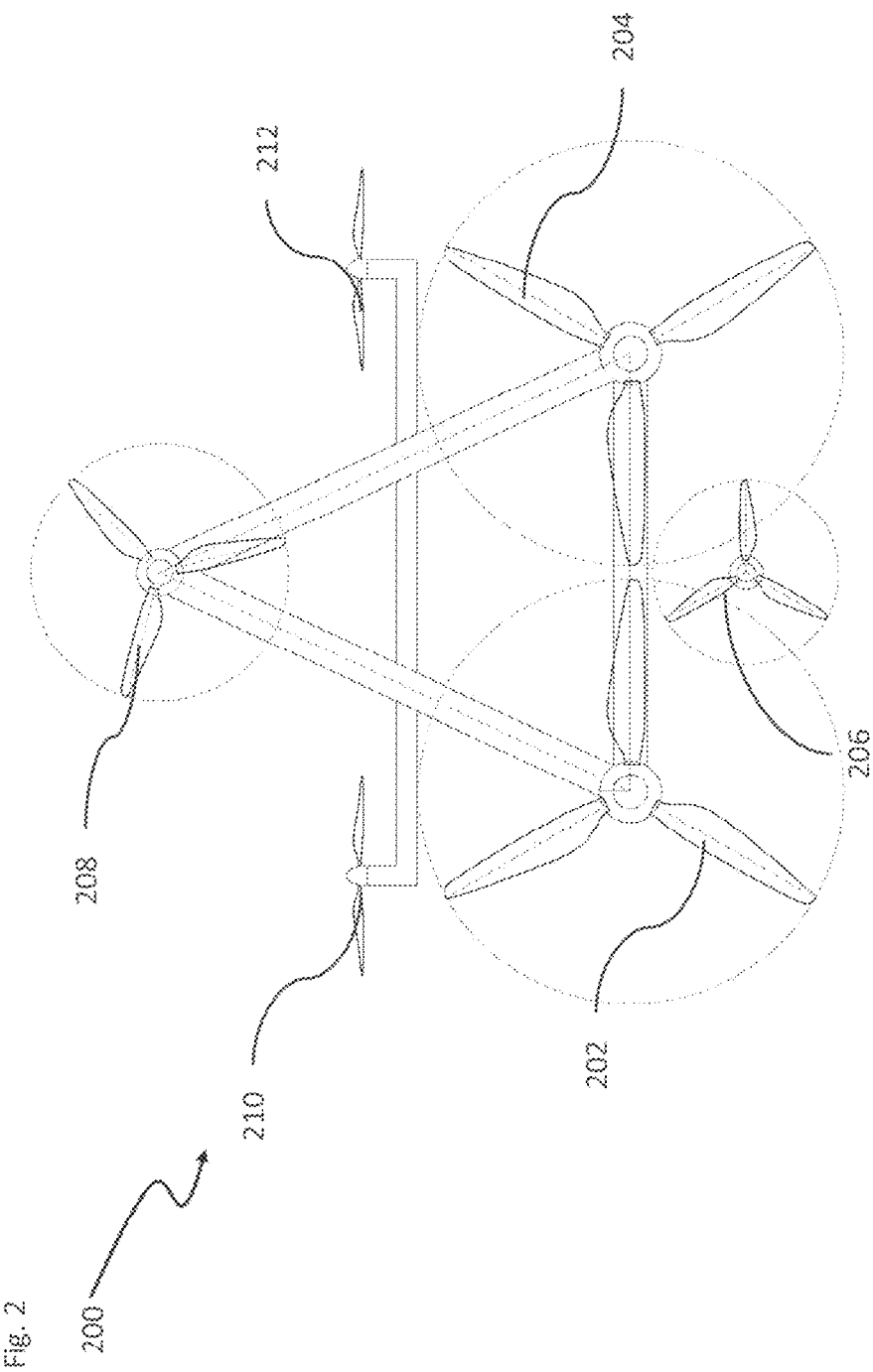
FIG. 2 illustrates a quad copter configuration with asymmetrically sized auxiliary rotors in accordance with embodiments.

FIG. 2 is a conceptual illustration of a multi-rotor vehicle 200 that illustrates two main rotors (202 & 204) and two auxiliary rotors (206 & 208). The disposition of having a forward and an aft rotor can help to reduce the amount of unbalanced torque that could be produced by only one or the other auxiliary rotors. Unbalanced torque can create multiple problems in flight and is a highly undesirable condition in any aircraft. As such many embodiments of the aircraft can be configured to effectively reduce the unbalanced torque through the combination of vehicle configuration and rotor size. As an example, a reduction in size of 20% between the lifting rotors (202 and 204) from the auxiliary rotors can reduce the unbalanced torque as much as 67%. This can also be aided by the position of each of the rotors. In various embodiments, the position of the auxiliary rotors (206 and 208) can vary in relation to the main lifting rotors (202 and 204). For example, as illustrated in FIG. 2, some embodiments of the aircraft may position the forward rotor 206 such that the rotational area overlaps that of the main lifting rotors (202 and 204). Additionally, to counter the torque produced from the forward rotor 206 the rear rotor may be placed outside of the rotational area of the main lifting rotors (202 and 204).

In accordance with many embodiments, the size of the auxiliary rotors (206 and 208) may be smaller than that of the main lifting rotors (202 and 204). While the auxiliary rotors (206 and 208) can still produce lift, their primary function would be to help decouple the pitch and yaw controls from the lifting rotors (202 and 204). As such the small movements in the auxiliary rotors (206 and 208) can help to adjust the pitch of the vehicle 200 during flight. This can subsequently allow the main lifting rotors to then produce some horizontal thrust to propel the vehicle 200 forward or rearward, depending on the pitch angle. As can be appreciated, many embodiments may utilize variable pitched rotors for the auxiliary and/or the main lifters. This can help to further decouple the pitch and yaw controls from the main lifters and allow for smaller and less powerful rotors to be used to produce changes in flight controls. Additionally, as illustrated in FIG. 2, some embodiments of the vehicle 200 can position the auxiliary rotors in locations that would be capable of producing much larger pitch moments with smaller movement. For example, a rotor similar to the aft rotor 208 that is placed further away from the center of gravity of the vehicle would be more capable of generating a change in pitch with much less thrust change due to the moment created from the distance. Therefore, the pitch can be effectively decoupled from the main lifters (202 and 204) without significantly effecting the lift capabilities of the vehicle.

Further illustrated in FIG. 2 and in many other embodiments, the vehicle 200 can be configured with two or more horizontal thrust rotors (210 and 212). In numerous embodiments, the horizontal rotors (210 and 212) can be positioned symmetrically about the central plane of the vehicle and positioned above or below the main lifting rotors. Since a primary function of the vehicle design and rotor configuration is to decouple and simplify controls, it can be appreciated that the horizontal thrusters (210 and 212) can be smaller diameter rotors and still produce sufficient horizontal thrust for the vehicle. This can be due to the fact that the auxiliary rotors (206 and 208) are capable of controlling pitch and allowing the main lifting rotors to translate some of their thrust into horizontal thrust. Thus, the effective thrust can be augmented by the horizontal thrust rotors (210 and 212). Alternatively, the vehicle can be so oriented in flight, that the lifting rotors provide strictly lift, while the horizontal thrust rotors (210 and 212) carry the full burden of providing thrust for vehicle forward motion. In addition to providing horizontal thrust, the thrust rotors (210 and 212) can be used to control the yaw motion of the vehicle. The spinning up or down of one or the other can effectively produce a thrust that would adjust the yaw. As with the smaller auxiliary rotors, smaller horizontal thrusters can be more efficient and can have slight adjustments equate to larger more effective flight controls. As can be further appreciated, many embodiments of the horizontal thrusters (210 and 212) can have variable collective pitch rotors for improved controls. Although not readily illustrated in FIG. 2, it can be appreciated that each of the pairs of rotors discussed can be configured to be counter rotating. This can be advantageous in reducing the unbalanced torque that is applied as each individual rotor spins. Additionally, the counter rotation of main lifting rotors 202 & 204 provides cancellation of the rolling moment of the vehicle in forward flight because the advancing/retreating blades of the two rotors are respectively complementary. The configuration of rotors in FIG. 2 is merely illustrative of a possible configuration of rotors in accordance with some embodiments. Such configurations can be seen in a copending U.S. patent application Ser. No. 17/648,381. The disclosure of which is included herein by reference.

Figure 3:
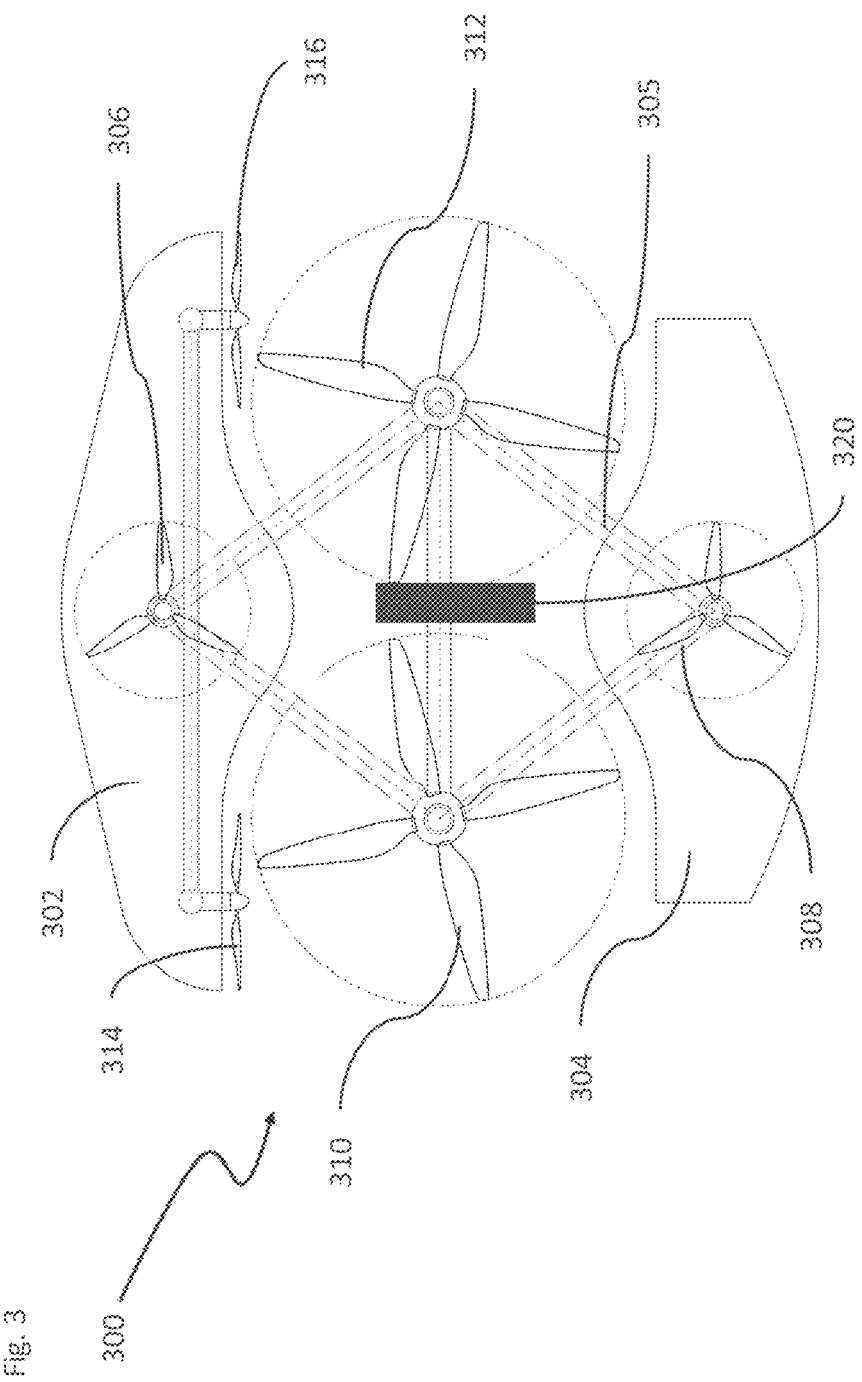
FIG. 3 Illustrates a multi-rotor vehicle with a partial rotor-in-wing configuration in accordance with embodiments.

Referring now to FIGS. 3 through 8, many embodiments of an aircraft can be modified with the addition of one or more fixed wing elements to help provide additional sustained lift for longer flights. For example, FIG. 3 illustrates a multi-rotor aircraft 300 with a forward 302 and an aft 304 wings connected to a framework 305. In various embodiments the fixed wings (302 and 304) may be symmetrically located along a central plane of the aircraft. The auxiliary rotors (306 and 308) can be positioned within each respective wing. The position of the fans within the wing can help to reduce the interference from the lift of the wing with the respective rotors, as previously discussed. As illustrated, the forward and aft positioning of the wings (302 & 304) leave open and unimpeded the downwash area of each of the main rotors (310 and 312). The wing elements (302 & 304) can operate to provide lift for the entirety of the aircraft 300 and thereby relieve the requirement for the main (310 & 312) and auxiliary (306 & 308) to provide lift in cruising-flight or maneuvering flight.

Additionally, many embodiments can utilize a number of horizontal thrusters 314 & 316 to provide forward thrust for the aircraft 300 such that the wings (302 & 304) continue to provide sufficient lift to continue flight. In various embodiments, the wings (302 and 304) can be contoured or shaped in such a way that the body of the wing does not interfere with any of the main rotors (310 & 312). Although FIG. 3 illustrates an aircraft with partial in-wing rotors, the size and shape of each of the wings can take on any suitable configuration depending on the desired requirements for the aircraft. Additionally, although the framework 305 is illustrated as a particular shape, it should be understood that the aircraft 300 can take on any number of suitable framework 305 structures to support the various rotors and/or wing elements. Furthermore, the use of in-wing and/or partial in-wing configurations with multiple rotors can help improve the overall efficiency of the rotors and thus extend the life of the power supply system. For example, the wing configuration can allow the fwd 306 and aft 308 auxiliary rotors to be locked in a fixed rotation, fixed blade pitch, or both. Other embodiments can allow for the auxiliary rotors to be completely powered off during forward flight.

As can be appreciated, many embodiments can be configured with a variety of other subsystems to help facilitate the controls of the aircraft. For example, the aircraft 300 can have a central control system 320 located at any suitable location. The control system 320 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 300 can house other computers or electronic connections that can communicate with a host of other systems such as cameras, navigation sensors and antennas, accelerometers, etc. that can be used to help control the flight of the aircraft.

Figure 4:
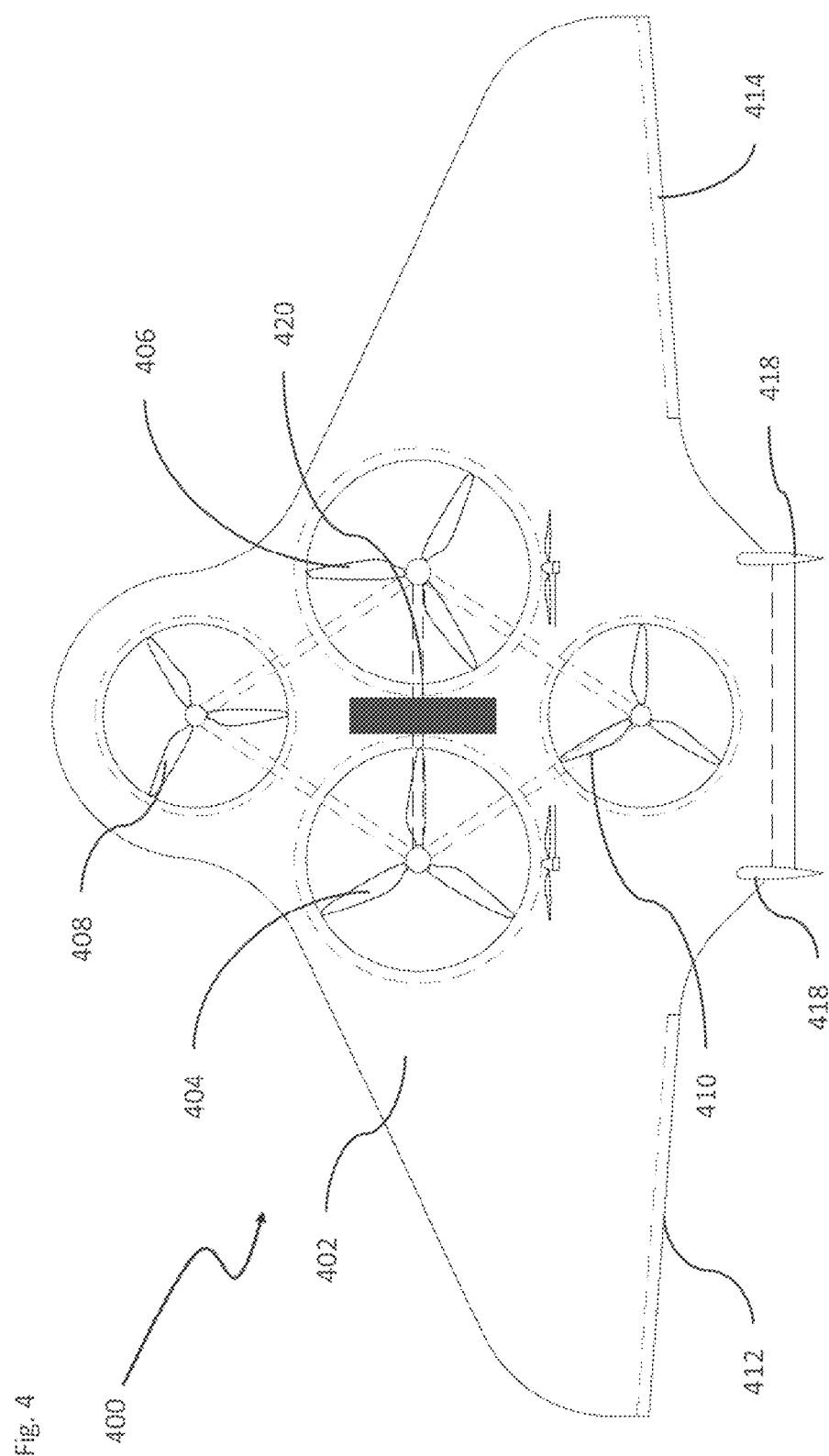
FIG. 4 illustrates a multi-rotor vehicle with a rotor-in-wing configuration in accordance with embodiments.

FIG. 4 further illustrates an embodiment of a multi-rotor aircraft 400 that has a fixed wing element 402. In various embodiments the fixed wing may be symmetrically located along a central plane of the aircraft. As can be seen, the fixed wing element 402 can function as a shroud that surrounds the various rotors (404-410). As can be appreciated, the embodiment of the aircraft shown in FIG. 4 can utilize the main rotors (404 & 406) in conjunction with the auxiliary rotors (408 & 410) to generate the vertical and horizontal motion of the aircraft 400. In numerous embodiments, the wing element 402 can have control surfaces (412-414). The control surfaces (412-414) can be used to provide the pitch and roll authority of the aircraft 400, thus ensuring that the main rotors (404 & 406) are no longer required to generate necessary thrust for roll and pitch authority. Accordingly, the power requirement for the rotors can be reduced to extend overall flight time and distance. In some embodiments, the aircraft 400 can be configured with a tail wing element or empennage 418 positioned at the aft of the aircraft 400. The tail wing 418 can be one or more elements configured to provide additional yaw control to the aircraft 400. Although not shown, some embodiments of the tail fins or empennages 418 can have one or more control surfaces to aid in providing yaw control of the vehicle. Adding yaw control by means of control surfaces would reduce the load needed on any horizontal thrusters to produce the yaw moments necessary for various flight controls. The empennages 418 can be located at an aft section of the wing element 402 or may be located at any suitable location on the aircraft.

As can be appreciated, many embodiments can be configured with a variety of other subsystems to help facilitate the controls of the aircraft. For example, the aircraft 400 can have a central control system 420 located at any suitable location. The control system 420 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 400 can house other computers or electronic connections that can communicate with a host of other systems such as cameras, navigation sensors and antennas, accelerometers, etc. that can be used to help control the flight of the aircraft.

Figure 5:
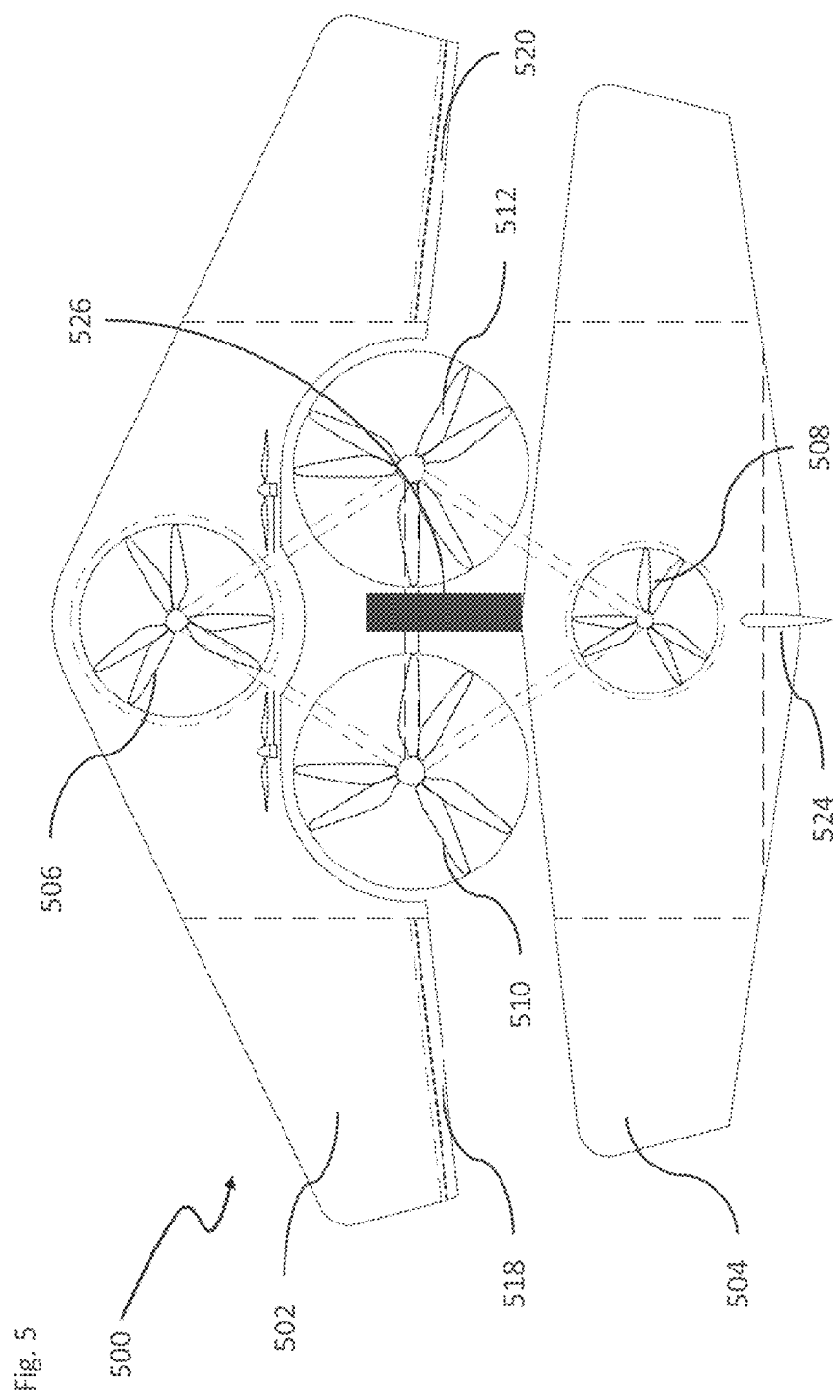
FIG. 5 illustrates a multi-rotor vehicle with a partial rotor-in-wing configuration in accordance with embodiments.

As can be appreciated, the configuration of various control surfaces and/or wing elements can be modified in any number of different configurations. For example, FIG. 5 illustrates an embodiment of a partial in-wing rotor configured aircraft 500 with a fwd 502 and aft 504 wing element. The fwd and aft wing elements (502 & 504) provide a shroud around the associated fwd and aft rotors (506 & 508). Additionally, the wing structures are configured to partially enclose the main rotors (510 & 512). The partial enclosure helps prevent interference with the downwash of the rotors or the lift generated by the wings, thus keeping the lift properties of each element separate.

Similar to other embodiments, the aircraft 500 can be configured with control surfaces (514 & 516) which can be positioned within the wing elements. The control surfaces (518 & 520) can be positioned at any reasonable location on either of the wing elements (502 & 504) such that they are configured to alter the airflow pattern around the airfoil or wing element. This can help to provide additional lift, reduce or induce drag on the aircraft to help improve the controllability of the aircraft 500.

In some embodiments, the aft wing element 504 can have an empennage 524 to help provide stability during flight. In some embodiments, the empennage can be formed of more than one element; similar to that illustrated in FIG. 4. In other words, the aircraft 500 may have more than one empennage 524 positioned on the aircraft 500 in any suitable location. Furthermore, the empennage 524 can be configured to have other control surfaces (not shown) that can be used to improve flight stability and control yaw of the aircraft 500. In some embodiments, the wing can be split into inboard and outboard panels, such that the outboard panels can be removed and the aircraft flown without them. For applications requiring longer cruise distance where aerodynamic efficiency is more important, the outboard wing panels are reinstalled.

As can be appreciated, many embodiments can be configured with a variety of other subsystems to help facilitate the controls of the aircraft. For example, the aircraft 500 can have a central control system 526 located at any suitable location. The control system 526 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 500 can house other computers or electronic connections that can communicate with a host of other systems such as cameras, navigation sensors and antennas, accelerometers, etc. that can be used to help control the flight of the aircraft. The control system can blend flight controls for the rotors with that for the ailerons/elevators/rudders associated with the wing elements or empennage elements.

Figure 6:
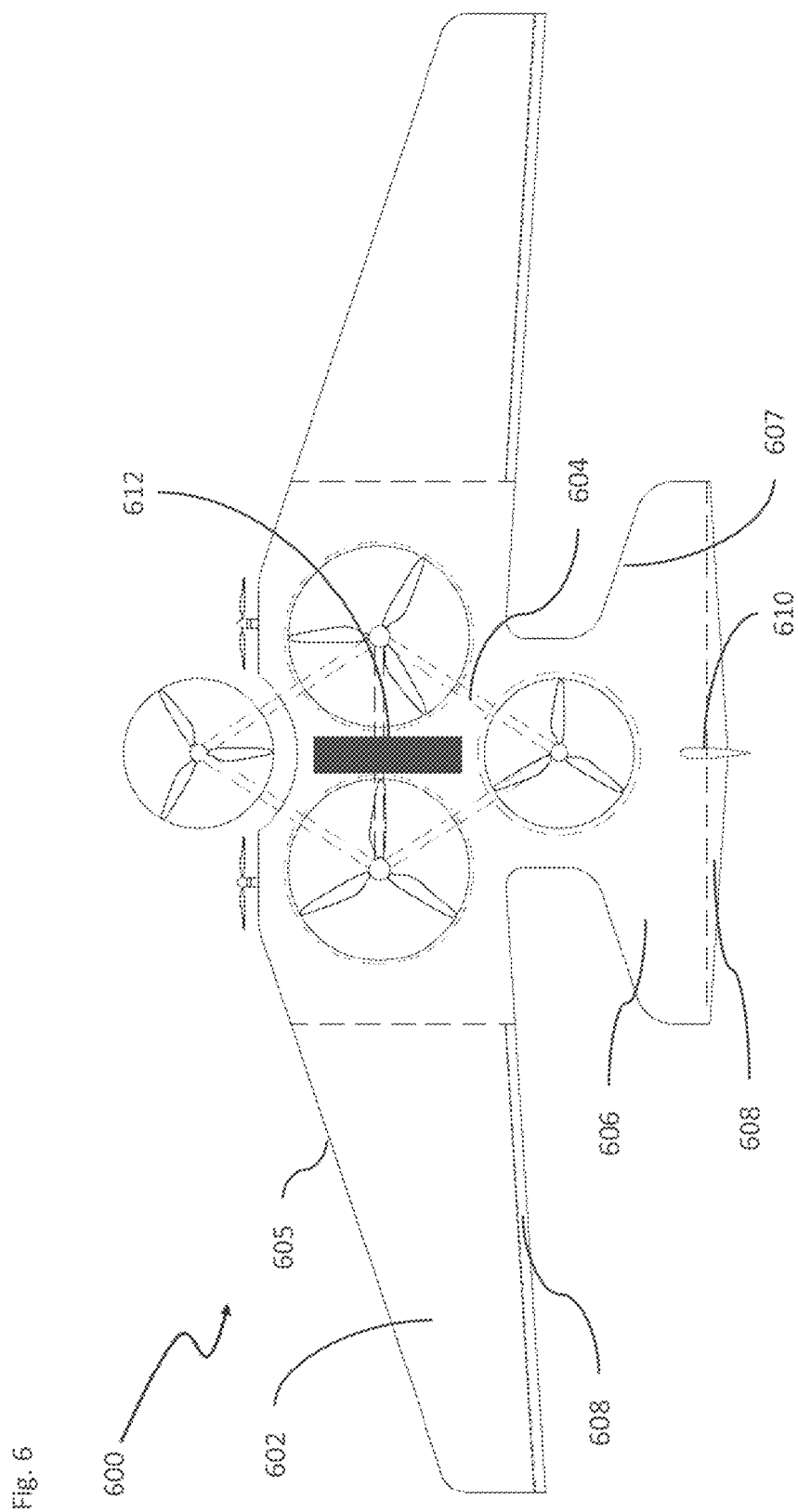
FIG. 6 illustrates a multi-rotor vehicle with a partial rotor-in-wing configuration in accordance with embodiments.

The wing shape and position of an aircraft can take on any suitable configuration in accordance with numerous embodiments. For example, FIG. 6 illustrates a top view of a multi-rotor aircraft 600 with a wing shaped structure 602 positioned over a support frame 604 where the wing pattern has a high aspect ratio. The shape illustrated in FIG. 6 can have a swept back front leading edge 605 of the wing element 602 and a rear horizontal stabilizer 606 that has a narrow to wide swept back front leading edge 607 as well. The wing speed is chosen such that the aerodynamic center of the combination of wing and empennage elements is near the center of mass of the aircraft, slightly behind it. This ensures static aerodynamic stability, and simplifies the blending of the flight control system for rotor-borne flight and for wing-borne flight. Additionally, the aircraft 600 can have one or more empennages 608 located near the aft portion of the horizontal stabilizer 606. As with various embodiments of aircraft illustrated herein, the aircraft 600 can have one or more control surfaces such as elevators 608 positioned in the wings 602 and horizontal stabilizer 606. It can be appreciated from the previous discussion that control surfaces placed in the wing elements and/or the empennage 610 can add additional control authority to the aircraft and the pilot of the aircraft; whether it be remote controlled by a computer or by a human counterpart.

As can be appreciated, many embodiments can be configured with a variety of other subsystems to help facilitate the controls of the aircraft. For example, the aircraft 600 can have a central control system 612 located at any suitable location. The control system 612 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 600 can house other computers or electronic connections that can communicate with a host of other systems such as cameras, navigation sensors and antennas, accelerometers, etc. that can be used to help control the flight of the aircraft. For example, some embodiments can utilize a network of cameras and other sensors to control the movement of the vehicle in any environment. The cameras and other sensors can be in situ or external networked using cellular networks or wireless networks to communication and provide a control methodology for the vehicle.

Figure 7:
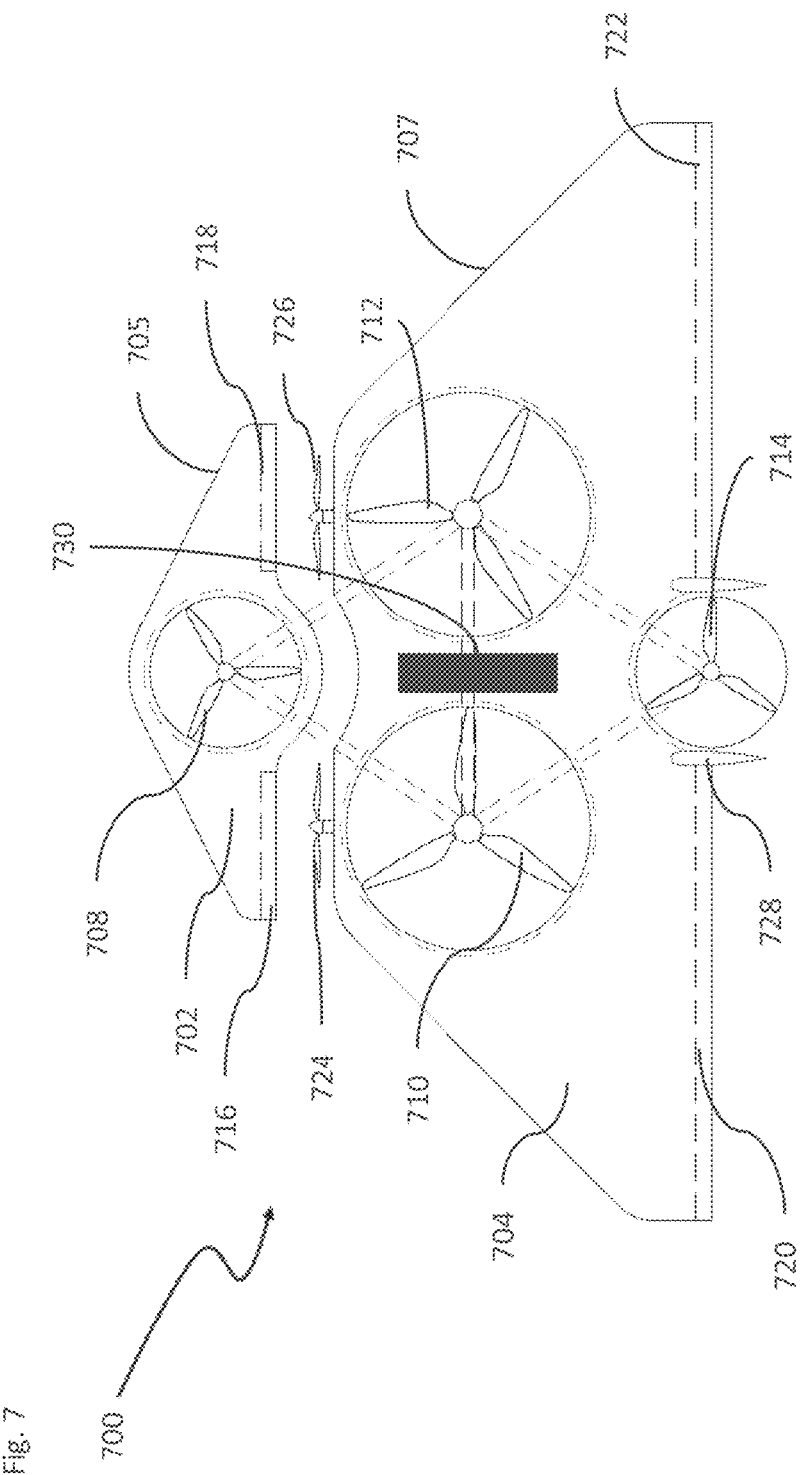
FIG. 7 illustrates a multi-rotor vehicle with multiple partial rotor-in-wings configuration in accordance with embodiments.
Figure 8:
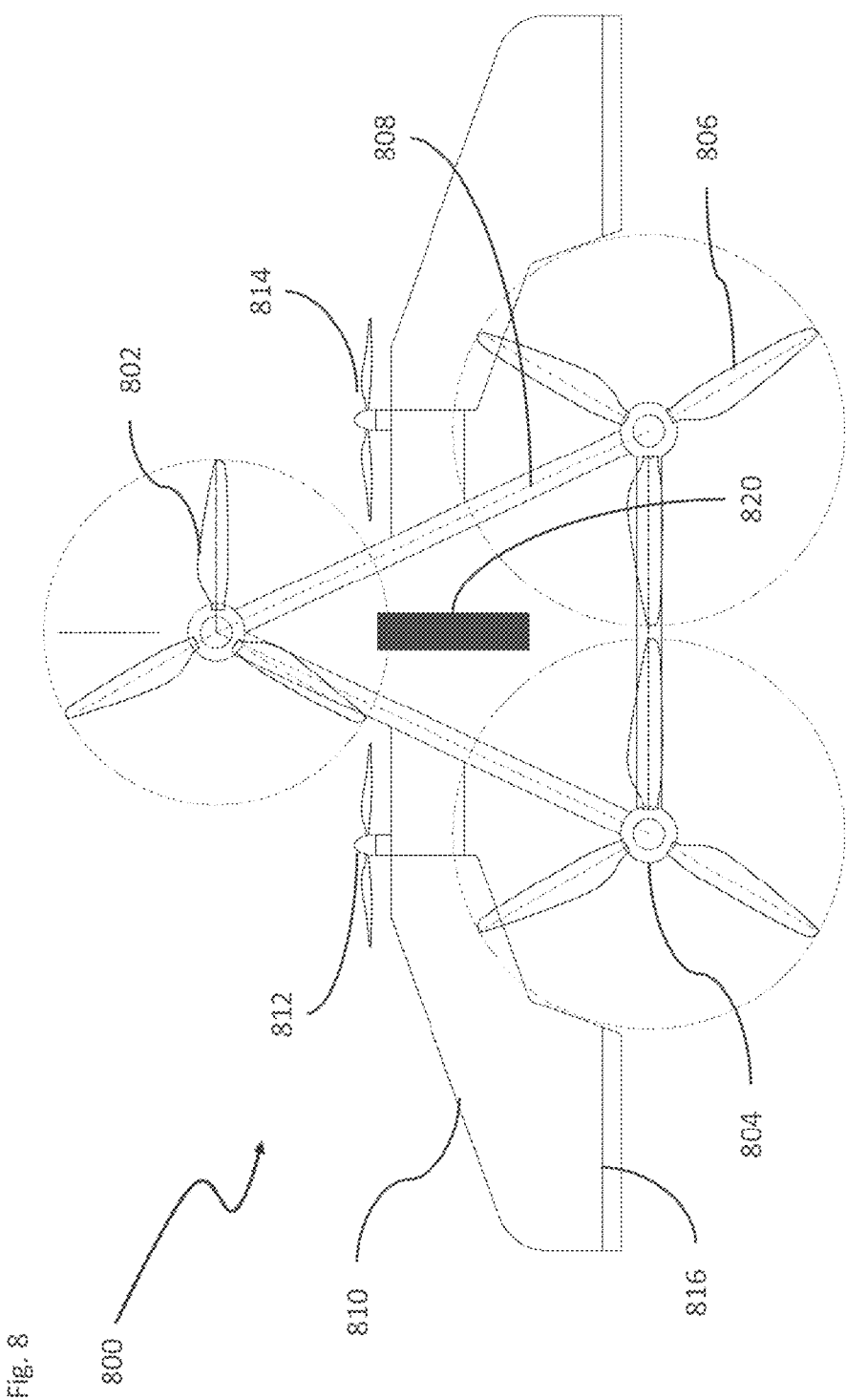
FIG. 8 conceptually illustrates a multi-rotor vehicle with a singular partial rotor-in-wing configuration in accordance with embodiments.

Although various embodiments of the aircraft may have a single wing structure that takes on a shape similar to a bird or other bioinspired design, as illustrated in FIG. 6, it can be appreciated that the wing structure can be separated into different components and sections and does not necessarily need to be a single structure. For example. FIG. 7 illustrates an embodiment of a multi-rotor aircraft 700 with an overall wing configuration (702 & 704) where each component has a swept back front leading edge (705 & 707). This can be an advantageous design with respect to aerodynamics and can help to improve the function and characteristics of the various rotors (708-714) such that the combination of the rotors and wing elements can generate lift and control authority of the overall aircraft 700. In numerous embodiments, each of the wing elements (702 & 704) can have individual control surfaces (716-722). For example, the front wing element 702 can have control surfaces that may align with the two horizontal thrusters (724 & 726). These can be used to adjust and direct airflow to the horizontal thrusters (724 & 726) as well as adjust the airflow around the rear wing element (704). This may offer improvement in aircraft pitch-authority. Similar to other embodiments, the aircraft 700 can also have one or more empennages 728 located at any suitable location, to improve stability and control authority of the aircraft. It should be well appreciated that the number and type of control surfaces can vary depending on the overall desired function of the aircraft as well as the mission requirements.

As can be appreciated, many embodiments can be configured with a variety of other subsystems to help facilitate the controls of the aircraft. For example, the aircraft 700 can have a central control system 730 located at any suitable location. The control system 730 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 700 can house other computers or electronic connections that can communicate with a host of other systems such as cameras, navigation sensors and antennas, accelerometers, etc. that can be used to help control the flight of the aircraft.

Although the multi-rotor aircraft illustrated in FIGS. 2-7 utilize at least four lifting rotors, it can be appreciated that similar effects of partial in-wing configurations can be achieved with fewer or more rotors. For example, FIG. 8 conceptually illustrates a multi-rotor aircraft 800 with three main lifting rotors (802-806) connected to a frame structure 808. The frame structure, or body structure, can be made up of any number of components such as interconnected elongated support elements or any suitable support structure. At least two of the main lifting rotors are symmetrically located (804 & 806) about a central axis or symmetry plane of the aircraft 800 and are configured to be partially enclosed by a fixed wing element 810. In various embodiments, the front rotor 802 can vary in size and does not have to be equivalent to the diameter of the symmetrically disposed rotors. This may initially appear to be counter intuitive with respect to multi-rotor aircraft. However, many such embodiments can utilize the symmetrically placed rotors to produce sufficient lift in a vertical takeoff setting. Subsequently, the front rotor 802 can be used to adjust the pitch of the aircraft 800. Additionally, a smaller front rotor 802 can require less power to operate and still be capable of producing sufficient pitch authority in flight. It should also be understood that the placement of the front auxiliary rotor 802 would be such that it is located at a distance greater than the diameter of the main rotors such that the respective downwashes do not interfere with each other.

As with other embodiments, horizontal flight can be initiated by the use of horizontal thrusters 812 and 814. The horizontal thrusters (812 and 814) can be positioned such the rotational plane of the horizontal thrusters (812 and 814) is perpendicular to the rotational plane of the main and auxiliary thrusters. This can help the vehicle transition between a vertical takeoff and horizontal flight. Once the aircraft is in horizontal flight the lift from the wing element 810 can reduce the need for the main rotors 802-806 to provide lift. Thus, reducing the power consumption of the vehicle for flight. Additionally, the fixed wing 810 can have control surfaces 816 for additional control authority of the aircraft. The fixed wing 810 can have removable panels outboard of the horizontal thrusters 812, to be retained or removed from the aircraft, depending on whether the mission is oriented to efficient VTOL operation from confined spaces, or for a longer-distance cruising mission.

As can be appreciated, many embodiments can be configured with a variety of other subsystems to help facilitate the controls of the aircraft. For example, the aircraft 800 can have a central control system 820 located at any suitable location. The control system 820 can be in communication with each of the various rotor systems to coordinate or transmit control signals such as the speed, pitch (if variable) and general function of the rotors. Accordingly, the control system can be configured to blend the actuation of the rotors and control surfaces of the fixed wing elements. Additionally, the control system 800 can house other computers or electronic connections that can communicate with a host of other systems such as cameras, navigation sensors and antennas, accelerometers, etc. that can be used to help control the flight of the aircraft.

Figure 9B:
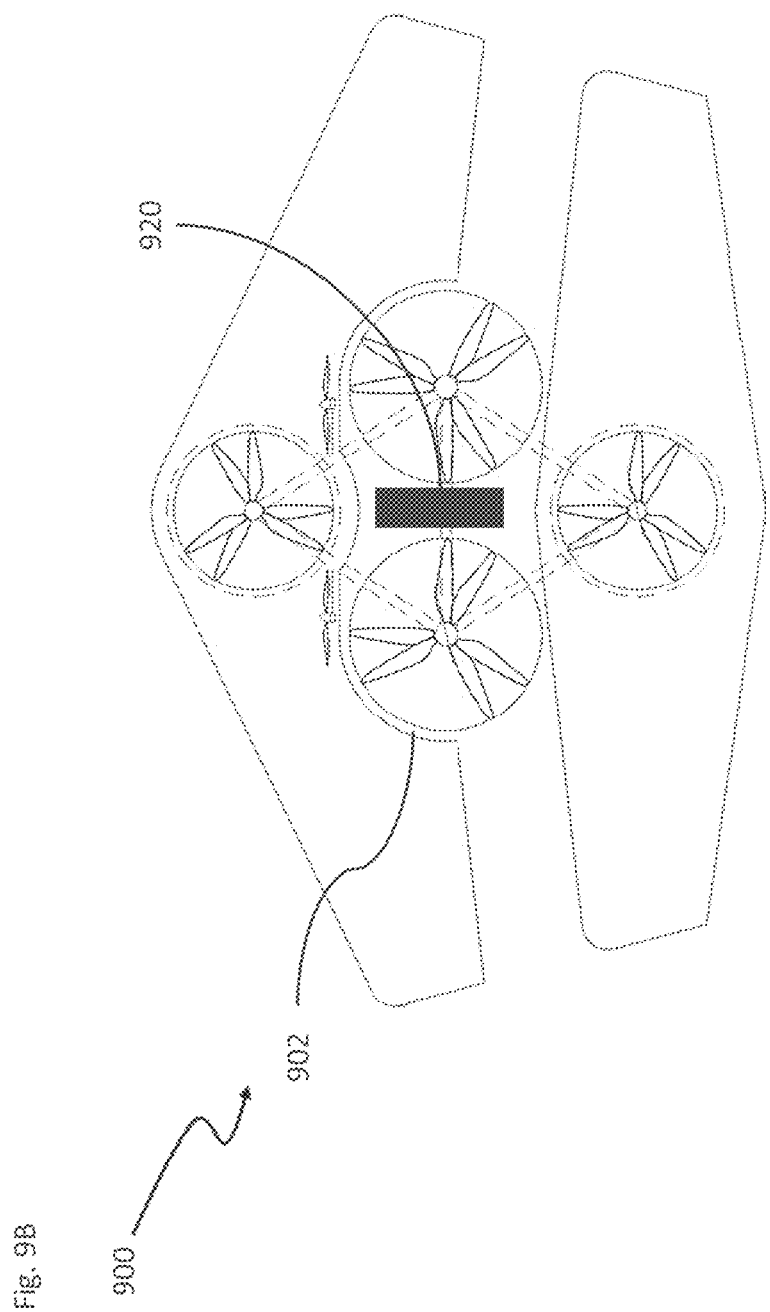
FIG. 9B conceptually illustrates a top view of a multi-rotor vehicle with coaxial rotors in accordance with embodiments.

As can be appreciated, the multi-rotor aircraft can take on any number of configurations with respect to the placement and number of rotors as well as the placement and number of fixed wing elements. Accordingly, the various elements of fixed wings and/or rotors can be combined or separated in any number of configurations. Additionally, while various embodiments illustrate individual rotors separated from other rotors, it can be appreciated that some embodiments may have coaxial propellers. For example, FIGS. 9A and 9B illustrate a multi-rotor aircraft 900 with a coaxial propeller configuration. As illustrated, some embodiments can have one or more rotors 902 with a coaxial configuration. By coaxial, it is meant to have a top propeller 904 and a bottom propeller 906 coaxially aligned; or one propeller directly above another. The coaxial alignment of the top and bottom propellers can help to improve the range and endurance of the aircraft 900 by tailoring the thrust of either or both of the propellers to a given payload mass, flight speed or other mission parameters. The propellers, in accordance with numerous embodiments, can have a variable collective pitch that can improve efficiency in high speed cruise or aggressive climbing operations.

As can be appreciated, many embodiments can be configured with a variety of other subsystems to help facilitate the controls of the aircraft. For example, the aircraft 900 can have a central control system 920 located at any suitable location. The control system 920 can be in communication with each of the various rotor systems to coordinate or transmit control signals such as the speed, pitch (if variable) and general function of the rotors. Additionally, the control system 900 can house other computers or electronic connections that can communicate with a host of other systems such as cameras, navigation sensors and antennas, accelerometers, etc. that can be used to help control the flight of the aircraft.

Figure 10:
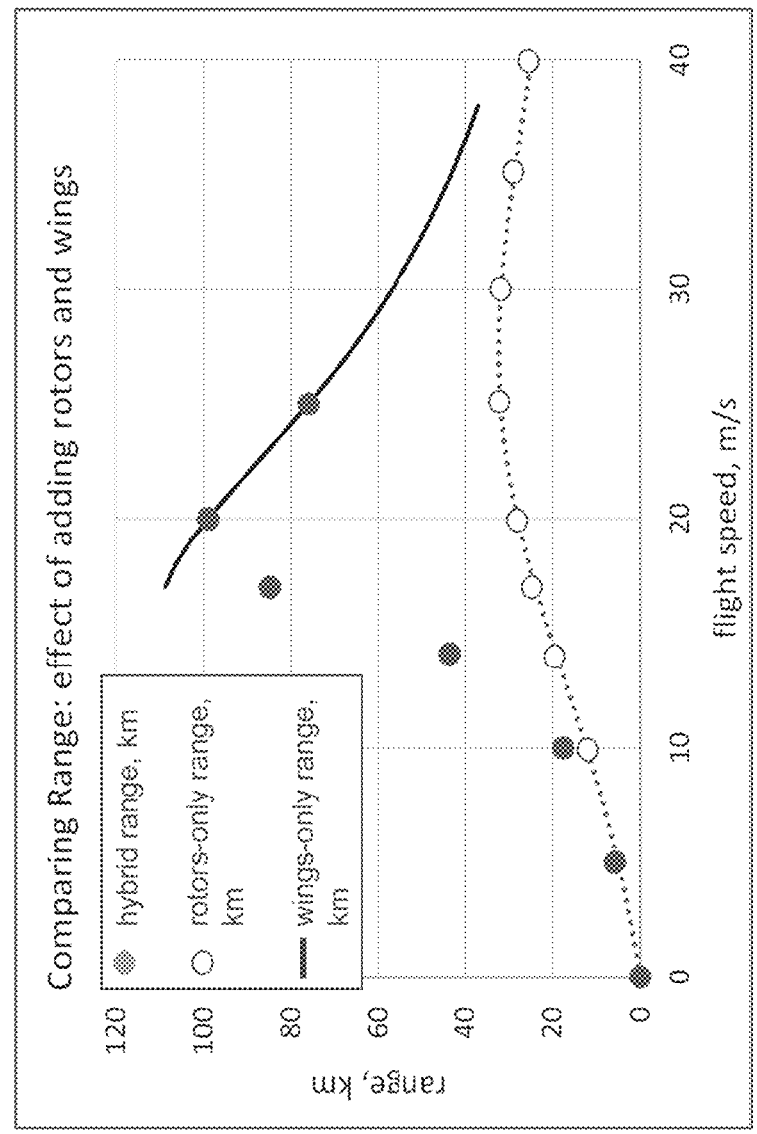
FIG. 10 is a graphical illustration of range vs. flight speed in accordance with various embodiments.

As has been illustrated in the various embodiments discussed herein, there are some particular advantages to having a hybrid wing and rotor configuration. For example, having a combined configuration can help to improve the range of the aircraft without necessarily reducing the power consumption of the aircraft. FIG. 10 illustrates the potential tradeoff between range and flight speed with respect to embodiments that combine rotors and wings versus those with only one or the other.

SUMMARY & DOCTRINE OF EQUIVALENTS

As can be inferred from the above discussion, the above-mentioned concepts can be implemented in a variety of arrangements in accordance with embodiments of the invention. Specifically, the use of a configuration of rotors that decouples the controls from each set of rotors in order to simplify the control system. Additionally, a number of embodiments incorporate additional smaller thruster rotors to generate thrust and/or yaw control of a vehicle. Moreover, various embodiments incorporate a partial in-wing configuration to take advantage of the flight characteristics of both fixed wing and rotary wing designs.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A multi-rotor vehicle comprising:
a body structure,
at least two main rotors connected to the body structure wherein the at least two main rotors are symmetrically disposed about a symmetry plane of the multi-rotor vehicle having at least one propeller and wherein each of the at least two main rotors are configured to generate lift for the multi-rotor vehicle;
at least one auxiliary rotor connected to the body structure disposed centrally along the symmetry plane being separated from the at least two main rotors by a distance greater than a diameter of the at least two main rotors such that a downwash from the at least two main rotors and a downwash from the at least one auxiliary rotor does not interfere;
at least two horizontal thrust rotors connected to the body structure and evenly disposed about the symmetry plane and configured to generate thrust in a forward direction such that a rotational plane of the at least two horizontal thrust rotors is perpendicular to a rotational plane of the at least two main rotors; and
at least one fixed wing element removably disposed on the body structure and configured to provide additional lift for the multi-rotor vehicle, the at least one fixed wing element comprising a wing planform spanning symmetrically across the symmetry plane and including at least one opening therein, the opening fully surrounding at least one of the at least one auxiliary rotor and the at least two main rotors to form a rotor-in-wing configuration, and wherein the other of at least one of the at least one auxiliary rotor and the at least two main rotors are partially enclosed by the wing planform of the at least one fixed wing element to form a partial in-wing rotor configuration, such that the at least one fixed wing element forms a shroud.

2. The multi-rotor vehicle of claim 1, wherein the at least two horizontal thrust rotors can be used to affect a yaw moment in the multi-rotor vehicle through adjusting a rotational speed of each of the at least two horizontal thrust rotors.

3. The multi-rotor vehicle of claim 1, wherein the body structure is a plurality of elongated structural support elements and disposed such that at least one structural support element interconnects the at least two main rotors and additional structural support elements interconnect the at least two main rotors to the at least one auxiliary rotor.

4. The multi-rotor vehicle of claim 1, wherein the at least one auxiliary rotor is smaller than each of the at least two main rotors.

5. The multi-rotor vehicle of claim 1, further comprising a plurality of control surfaces disposed in an aft portion of the at least one fixed wing element, wherein each of the plurality of control surfaces can be adjusted to control a movement of air around the at least one fixed wing element thus enabling flight control or control of the pitch, roll, and yaw of the multi-rotor vehicle.

6. The multi-rotor vehicle of claim 5, further comprising a control system disposed within the body structure of the multi-rotor vehicle and wherein the control system is connected to each of the at least two main rotors, the at least one auxiliary rotor and the at least two horizontal thrust rotors such that the control system can transmit control signals to each of the rotors and each of the plurality of control surfaces and thereby control the lift, pitch, yaw, and roll of the multi-rotor vehicle.

7. The multi-rotor vehicle of claim 1, further comprising a second auxiliary rotor wherein the at least one auxiliary rotor is disposed forward of the at least two main rotors and the second auxiliary rotor is disposed aft of the at least two main rotors.

8. The multi-rotor vehicle of claim 7, wherein each of the at least one and second auxiliary rotors are smaller than the at least two main rotors.

9. The multi-rotor vehicle of claim 1, further comprising at least one empennage disposed on at least an aft portion of the at least one fixed wing element.

10. The multi-rotor vehicle of claim 9, wherein the at least one empennage further comprises at least on control surface.

11. The multi-rotor vehicle of claim 9, further comprising at least two empennages.

12. The multi-rotor vehicle of claim 1, wherein each of the at least two main rotors has at least two propellers coaxially aligned wherein at least one of the at least two propellers is located directly above another of the at least two propellers.

13. The multi-rotor vehicle of claim 1, further comprising a horizontal stabilizer wing disposed on the body structure and located aft of the at least two main rotors.

14. The multi-rotor vehicle of claim 13, further comprising at least one control surface disposed within the horizontal stabilizer wing.

15. The multi-rotor vehicle of claim 1, further comprising a control system disposed within the body structure of the multi-rotor vehicle and wherein the control system is connected to each of the at least two main rotors, the at least one auxiliary rotor and the at least two horizontal thrust rotors such that the control system can transmit control signals to each of the rotors and thereby control the lift, pitch, yaw, and roll of the multi-rotor vehicle.

16. The multi-rotor vehicle of claim 15, wherein the control system is managed remotely by a computer.

17. The multi-rotor vehicle of claim 16, wherein the control system is managed remotely by a human.

18. The multi-rotor vehicle of claim 1, wherein the at least one fixed wing element fully encloses the at least two main rotors and the at least one auxiliary rotor.

19. The multi-rotor vehicle of claim 1, further comprising at least a second fixed wing element disposed on the body structure wherein the at least a second fixed wing element is disposed aft of the at least two main rotors and aft of the at least one fixed wing element.

20. The multi-rotor vehicle of claim 1, wherein the at least one fixed wing element has a front leading edge with a swept back design.

\* \* \* \* \*